United States Patent [19]

Kouwenhoven et al.

[11] 3,758,667
[45] Sept. 11, 1973

[54] PROCESS FOR THE PREPARATION OF MORDENITE

[76] Inventors: Herman W. Kouwenhoven; John Cole, both of 3, Badhuisweg, Amsterdam, Netherlands

[22] Filed: Mar. 18, 1971

[21] Appl. No.: 125,845

[30] Foreign Application Priority Data
Apr. 3, 1970  Netherlands...................... 7015942

[52] U.S. Cl.............. 423/118, 423/329, 252/455 Z
[51] Int. Cl............................................ C01b 33/28
[58] Field of Search...................... 23/111, 112, 113; 252/455 Z; 423/118, 329

[56] References Cited
UNITED STATES PATENTS

| | | | |
|---|---|---|---|
| 3,615,188 | 10/1971 | Kouwenhoven et al. | 23/113 |
| 3,436,174 | 4/1969 | Sand | 23/113 |
| 3,386,801 | 6/1968 | Kuehl | 23/113 X |
| 3,443,892 | 5/1969 | Wacks et al. | 23/113 |
| 3,334,964 | 8/1967 | Reid | 23/113 |
| 3,328,119 | 6/1967 | Robson | 23/113 |

FOREIGN PATENTS OR APPLICATIONS
984,502  2/1965  Great Britain ...................... 23/113

OTHER PUBLICATIONS
Barrer et al. J. Chem. Soc. 1965, pages 6621–6628

*Primary Examiner*—Edward J. Meros
*Attorney*—John M. Duncan and Glen R. Grunewald

[57] ABSTRACT

High purity mordentie having a very small particle size is prepared at temperatures below 160°C by heating an aqueous mixture of amorphous silica-alumina having a silica/alumina molar ratio between 9.5 and 12.5 and one or more sodium compounds wherein at least 70 mol percent of the sodium, as $Na_2O$, originates from sodium salts of polybasic acids having a $pK$ value $>10$ at 18°C for the highest dissociation step. The relation between the $Na_2O/Al_2O_3$ molar ratio, $m$, in the starting mixture and the applied reaction temperature, $t$, which is 160°C or lower, is $m = 8.3 - 0.06(t-100) \pm 2.3$.

8 Claims, No Drawings

PROCESS FOR THE PREPARATION OF MORDENITE

BACKGROUND OF THE INVENTION

The invention relates to a process for the preparation of mordenite at a relatively low temperature, starting from amorphous silica-alumina.

Mordenite is a zeolite of the aluminosilicate type with the following composition expressed in moles of the oxides: $1.0 \pm 0.2$ $Na_2O \cdot Al_2O_3 \cdot 10 \pm 0.5$ $SiO_2$. It may occur either in hydrated or in dehydrated form. Mordenite has recently become highly popular because of its suitability as a carrier material for isomerization and hydrocracking catalysts.

Zeolites of the aluminosilicate type are usually prepared by keeping an aqueous alkaline mixture comprising certain amounts of one or more aluminum compounds and one or more silicon compounds at an elevated temperature for some time and subsequently separating the zeolite formed from the mother liquor.

A preferred method for preparing mordenite involves heating an aqueous alkaline mixture with the following composition expressed in moles of the oxides: $1.2 - 2.8$ $Na_2O \cdot Al_2O_3 \cdot 9.5 - 12.5$ $SiO_2 \cdot 60 - 300$ $H_2O$ comprising amorphous silica-alumina, sodium hydroxide and water, under pressure for 4–40 hours at a temperature of 180°–260°C and subsequently the mordenite formed is separated from the mother liquor. This preparation method, starting from amorphous silica-alumina, offers the advantage over preparation procedures in which other aluminum and silicon sources are applied, that a synthetic mordenite is obtained which has very low contamination with zeolites different from mordenite and/or amorphous material. A drawback of this method of preparing mordenite is, however, that a relatively high reaction temperature of at least 180°C is required. These high temperatures generate high pressures and require expensive process equipment. Below this temperature products are formed comprising less than 80%w of mordenite and/or more than 5%w of zeolites different from mordenite. Efforts to improve the process in this respect gave rather disappointing results. Although it is possible to carry out the preparation at a lower temperature by increasing the reaction time with or without an increase of the amount of sodium hydroxide, these measures only lead to minor improvements. To prepare mordenite with the same high quality as before, a small decrease in reaction temperature requires a very large increase in reaction time. A further decrease in reaction temperature results in reaction times longer than 350 hours being required, which are no longer attractive from an economic point of view. Although increasing the concentration of sodium hydroxide in the starting mixture has a beneficial influence on the temperature-time relationship of the reaction, this measure can only be applied to a certain extent since it has appeared that if the concentration of sodium hydroxide in the starting mixture expressed as molar ratio $Na_2O/Al_2O_3$ is raised above 3.5, the mordenite prepared is contaminated with analcite. As the concentration of sodium hydroxide is further increased, more analcite is formed. In general it may be said that it is not possible to prepare, within 350 hours and at a temperature of 160°C or lower, a product comprising at least 80%w of mordenite and at most 5%w of zeolites different from mordenite, from an aqueous alkaline mixture comprising amorphous silica-alumina, if sodium hydroxide is used as source for sodium.

SUMMARY OF THE INVENTION

Very pure mordenite having a particle size about one tenth the normal size can be prepared from an aqueous mixture comprising amorphous silica-alumina having a silica/alumina molar ratio between 9.5 and 12.5 and one or more sodium compounds at a temperature of 160°C or lower and in a reasonable time, if at least 70 mol.% of the sodium present in the starting mixture expressed as $Na_2O$ originates from sodium salts of a certain class of polybasic acids. The polybasic acids concerned are those having a pK value $>10$ at 18°C for the highest dissociation step, e.g., $H_3PO_4$ and $H_2CO_3$. The required sodium concentration in the starting mixture depends on the reaction temperature applied as follows. At a reaction temperature $t$ as measured in degrees centigrade, the required sodium concentration in the starting mixture (m) expressed as molar ratio $Na_2O/Al_2O_3$ is given by the formula $m = 8.3-0.06$ $(t - 100) \pm 2.3$, where $t$ is 160°C or lower.

DETAILED DESCRIPTION OF THE INVENTION

The present invention relates to a process for the preparation of mordenite by heating an aqueous mixture comprising amorphous silica-alumina and one or more sodium compounds, wherein at least 70 mol.% of the sodium present in the starting mixture expressed as $Na_2O$, originates from sodium salts of polybasic acids having a pK value for the highest dissociation step measured at 18°C, which is larger than 10 and wherein the following relation exists between the $Na_2O/Al_2O_3$ molar ratio (m) in the starting mixture and the applied reaction temperature (t), which amounts at most to 160°C: $m = 8.3-0.06$ $(t-100) \pm 2.3$.

If the preparation of mordenite according to the invention is, e.g., carried out at a temperature of 150°C, the sodium concentration in the starting mixture expressed as molar ratio $Na_2O/Al_2O_3$ should be at least 3.0 and at most 7.6. If the preparation of mordenite according to the invention is, e.g., carried out at a temperature of 100°C the sodium concentration in the starting mixture expressed as molar ratio $Na_2O/Al_2O_3$ should be at least 6.0 and at most 10.6. If at the temperatures concerned sodium concentrations outside these ranges are applied, products are formed comprising less than 80%w of mordenite and/or more than 5%w of zeolites different from mordenite. It is very surprising that in contrast with sodium hydroxide, the present sodium salts are suitable for the preparation of mordenite at temperatures of 160°C and lower, since sodium hydroxide and the present sodium salts show a comparable performance if applied for the preparation of mordenite from amorphous silica-alumina at higher temperatures.

Sodium salts suitable for the preparation of mordenite according to the invention include sodium salts of both inorganic acids and organic acids provided that these acids fulfill the condition that the pK value of their highest dissociation step measured at 18°C is larger than 10. Examples of suitable inorganic acids are arsenic acid, orthoboric acid, carbonic acid and orthophosphoric acid. An example of a suitable organic acid is ascorbic acid. Preference is given to the application of sodium salts derived from orthophosphoric acid and carbonic acid, in particular to the application of $Na_3$-

PO$_4$. Of the sodium salts used, only the sodium is incorporated in the mordenite.

In the starting mixture according to the invention, comprising amorphous silica-alumina, water and one or more of the above-defined sodium salts, minor amounts of other sodium compounds may be present, provided that their concentration expressed as moles Na$_2$O is less than 30 percent of the total sodium concentration in the starting mixture, also expressed as mole Na$_2$O. As an example of such a sodium compound sodium hydroxide may be mentioned. The preparation or mordenite according to the invention, is however, preferably carried out, starting from a mixture in which the sodium originates completely or substantially completely from one or more of the above-defined sodium salts. The amount of sodium to be applied depends on the amount of alumina present in the starting mixture and on the temperature at which the reaction is carried out. The amount of water present in the starting mixture may vary between wide limits. Usually the starting mixture contains 60–300 moles of water for each mole of alumina present therein. The amorphous silica-alumina preferably has a silica/alumina molar ratio between 9.5 and 12.5. As amorphous silica-alumina preferably a cogel of aluminum hydroxide on silica hydrogel is applied. The term "cogel" is used here to refer to an amorphous silica-alumina obtained by precipitating on silica hydrogel an aluminum hydroxide gel. A cogel thus defined is therefore not a coprecipitate, since in the preparation of a coprecipitate silica hydrogel and aluminum hydroxide gel are simultaneously or almost simultaneously precipitated from the solution. It is assumed that in the cogel silica globules are covered with a layer of alumina. A very suitable method of preparing a silica-alumina cogel comprises first precipitating a silica hydrogel from an aqueous solution containing silicate ions by addition of a mineral acid, subsequently adding an aluminum salt to the mixture, and finally precipitating an aluminum hydroxide gel by addition of an alkaline-reacting solution. Instead of a cogel obtained by the above-described process, the cogel may very suitably be a commercial silica-alumina cracking catalyst with a low alumina content. Such cracking catalysts usually have an alumina content of about 11–15%w, and are also obtained as a cogel.

The preparation of mordenite according to the invention is carried out by keeping the starting mixture at an elevated temperature for some time. The preparation may be carried out at atmospheric pressure as well as elevated pressure. If use is made of reaction temperatures higher than the boiling point of the mixture, it is preferred to carry out the process in an autoclave at autogeneous pressure. The preparation of mordenite according to the invention is preferably carried out at a reaction temperature betewen 95° and 155°C. At these temperatures much lower pressures are generated than at the higher temperatures of prior processes.

From an economic point of view it is desirable to keep the reaction time as short as possible. Since the reaction time depends among other factors on the reaction temperature and on the amount of sodium present in the starting mixture, these two variables are preferably chosen in such a way in relation to each other that the formation of a very pure mordenite takes place as quickly as possible.

During the preparation, the reaction mixture is preferably agitated, since this has a beneficial influence on the yield of mordenite. This may be effected for instance by stirring, or shaking. After the formation of the mordenite, the crystals are separated from the mother liquor, for instance by filtration, decanting or centrifuging. The mass of crystals is then washed with water and finally dried at a temperature between 100° and 200°C.

Mordenite prepared according to the invention, using a silica-alumina cogel as amorphous silica-alumina, is obtained as a very fine powder with a crystal size of from 0.1 to 10$\bar{\mu}$. This is about one tenth the size of mordenite particles prepared from processes which employ higher temperatures and NaOH. For some applications of mordenite is is often desirable to have the mordenite available in larger particles. For this purpose the mordenite may be mixed with an inert binder and shaped into particles with a certain form or size. This technique is well known, e.g., in the preparation of catalyst carriers, and need not be described in greater detail. Examples of suitable binders are natural clays such as kaolin and bentonite and synthetic inorganic oxides such as alumina, silica, boria and zirconia or combinations thereof, such as silica-alumina and silica-zirconia.

Mordenite prepared according to the invention may be used for various applications, such as an adsorbent, as a molecular sieve for the separation of hydrocarbon mixtures as well as for the separation of gases, as a catalyst carrier and the like. In view of its high degree of purity mordenite prepared according to the invention is especially suitable as a catalyst carrier. Catalysts with excellent performance in hydrocarbon conversion processes, especially isomerization and hydrocracking catalysts, can be obtained by loading the mordenite, with or without using a binder, as described, with one or more metals of Group VIB, VIIB and/or VIII of the Periodic System of Elements.

The invention will now be further elucidated with the aid of the following examples.

In case reaction temperatures were applied above the boiling point of the mixture, the reaction was carried out in a closed vessel at autogeneous pressure. The composition of the products was established with the aid of X-ray analysis. In all experiments use was made of a commercial amorphous silica-alumina cracking catalyst having a water content of 25%w and comprising 14%w of alumina and 86%w of silica calculated on dry material, as amorphous silica-alumina.

EXAMPLE I

Five mixtures of the molar composition x Na$_2$O·Al$_2$O$_3$·10.4 SiO$_2$·253 H$_2$O were prepared by slowly adding with stirring a certain amount of sodium hydroxide to a mixture of 46 g of the above-described cracking catalyst in water. The mixtures were heated with stirring at a certain temperature and for a certain time. After the reaction mixture had cooled, the solid material was filtered off, washed with water until the pH of the filtrate was lower than 10 and dried at 120°C. The conditions and results of these experiments are summarized in Table I.

TABLE I

| Exp. No. | Amount of NaOH present in starting mixture, expressed as molar ratio Na$_2$O/Al$_2$O$_3$ | reaction temp. °C | reaction time hours | composition of the product obtained, %w |
|---|---|---|---|---|

| Exp. | Amount of Na₃PO₄... | reaction temp. °C | reaction time hours | composition of the product obtained, %w |
|---|---|---|---|---|
| 1 | 1.8 | 220 | 12 | 95 mordenite 5 amorphous material |
| 2 | 2.2 | 200 | 48 | 95 mordenite 5 amorphous material |
| 3 | 1.8 | 160 | 72 | 100 amorphous material |
| 4 | 4 | 150 | 72 | 100 analcite |
| 5 | 4 | 210 | 16 | 100 analcite |

EXAMPLE II

Eleven mixtures of the molar composition: $x$ $Na_3PO_4 \cdot Al_2O_3 \cdot 10.4$ $SiO_2 \cdot 253$ $H_2O$ were prepared by slowly adding with stirring a certain amount of $Na_3PO_4 \cdot 12$ $H_2O$ to a mixture of 46 g of the above-described cracking catalyst in water. The mixtures were heated with stirring at a certain temperature and for a certain time. After the reaction mixture had cooled, the solid material was filtered off, washed with water until the pH of the filtrate was lower than 10 and dried at 120°C. The conditions and results of these experiments are summarized in Table II.

TABLE II

| Exp. | Amount of Na₃PO₄ present in starting mixture, expressed as molar ratio Na₂O/Al₂O₃ | reaction temp. °C | reaction time hours | composition of the product obtained, %w |
|---|---|---|---|---|
| 6 | 2.0 | 150 | 72 | 100 amorphous material |
| 7 | 3.5 | 150 | 72 | 95 mordenite 5 amorphous material |
| 8 | 4.5 | 150 | 72 | 95 mordenite 5 amorphous material |
| 9 | 6.0 | 150 | 72 | 90 mordenite 10 amorphous material |
| 10 | 8.0 | 150 | 72 | 50 mordenite 50 analcite |
| 11 | 2.0 | 100 | 300 | 100 amorphous material |
| 12 | 6.0 | 100 | 320 | 90 mordenite 10 amorphous material |
| 13 | 8.0 | 100 | 320 | 95 mordenite 5 amorphous material |
| 14 | 9.0 | 100 | 172 | 90 mordenite 10 amorphous material |
| 15 | 10.5 | 100 | 240 | 90 mordenite 3 gmelenite 7 amorphous material |
| 16 | 12.0 | 100 | 172 | 50 gmelenite 50 amorphous material |

Of experiments 1–16, only 7–9 and 12–15 are according to the present invention. The other experiments are given for comparative purposes. A chemical analysis of the products resulting from experiments 7–9 and 12–15 showed that no phosphorus was present therein.

We claim as our invention:

1. A process for the preparation of mordenite which comprises heating an aqueous mixture of amorphous silica-alumina having a silica/alumina molar ratio between 9.5 and 12.5 and one or more sodium compounds wherein at least 70 mol.% of the sodium present in the starting material, expressed as $Na_2O$, originates from sodium salts of polybasic acids having a $pK$ value greater than 10 at 18°C for the highest dissociation step, and wherein the molar ratio, $m$, of $Na_2O/Al_2O_3$ in the starting mixture and the applied reaction temperature, $t$, which expressed in degrees centigrade is at most 160°C, is $m = 8.3 - 0.06$ $(t-100) \pm 2.3$.

2. The process of claim 1 wherein the sodium salts of polybasic acids are sodium salts of orthophosphoric acid or carbonic acid.

3. The process of claim 2 wherein the sodium salt is $Na_3PO_4$.

4. The process of claim 1 wherein the amorphous silica-alumina is a cogel of aluminum hydroxide on silica hydrogel.

5. The process of claim 4 wherein the silica-alumina cogel has been prepared by a procedure which comprises first precipitating a silica hydrogel from an aqueous solution containing silicate ions by adding a mineral acid, subsequently adding an aluminum salt to the mixture, and finally precipitating an aluminum hydroxide gel by adding an alkaline-reacting solution.

6. The process of claim 4 wherein the silica-alumina cogel is a commercial cracking catalyst with a low alumina content 7. The process of claim 1 wherein the reaction temperature is between 95° and 155°C.

8. The process of claim 1 wherin the reaction mixture is agitated during the preparation.

* * * * *